United States Patent
Yeou et al.

(10) Patent No.: US 8,059,605 B2
(45) Date of Patent: Nov. 15, 2011

(54) APPARATUS AND METHOD FOR ESTIMATING CELL LOAD IN WIRELESS COMMUNICATION SYSTEM

(75) Inventors: Hye-Jin Yeou, Suwon-si (KR); Tae-Ik Song, Suwon-si (KR); Bong-Gee Song, Seongnam-si (KR); Jong-Han Lim, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 452 days.

(21) Appl. No.: 12/287,843

(22) Filed: Oct. 14, 2008

(65) Prior Publication Data
US 2009/0097454 A1    Apr. 16, 2009

(30) Foreign Application Priority Data
Oct. 16, 2007   (KR) .................. 10-2007-0103902

(51) Int. Cl.
*H04W 4/00*         (2009.01)
(52) U.S. Cl. ........ 370/332; 370/321; 370/229; 455/453; 455/436; 455/522; 455/452; 455/562
(58) Field of Classification Search .................. 370/332, 370/321, 229; 455/452.2, 562.1, 452.1, 446, 455/453, 436, 522
See application file for complete search history.

(56) References Cited

U.S. PATENT DOCUMENTS

| | | | |
|---|---|---|---|
| 6,748,241 B2 * | 6/2004 | Voyer .......................... | 455/562.1 |
| 6,760,303 B1 * | 7/2004 | Brouwer ....................... | 370/229 |
| 6,937,863 B1 * | 8/2005 | Gordon et al. ................ | 455/446 |
| 2003/0228871 A1 * | 12/2003 | Bernhard et al. ........... | 455/452.2 |
| 2004/0121777 A1 * | 6/2004 | Schwarz et al. ............ | 455/452.1 |
| 2005/0117533 A1 * | 6/2005 | Cave ............................. | 370/321 |
| 2006/0166677 A1 * | 7/2006 | Derakshan et al. ........... | 455/453 |
| 2007/0270175 A1 * | 11/2007 | Malladi et al. ................ | 455/522 |
| 2010/0009682 A1 * | 1/2010 | Iwamura et al. .............. | 455/436 |

FOREIGN PATENT DOCUMENTS

| | | | |
|---|---|---|---|
| JP | 02006211645 A | * | 8/2006 |
| KR | 10-2003-0025621 | | 9/2001 |
| KR | 10-2005-0013416 | | 7/2003 |

* cited by examiner

*Primary Examiner* — David Q Nguyen (57) ABSTRACT

An apparatus and method for estimating a cell load in a wireless communication system are provided. The apparatus includes a ranging response counter, a load estimator, an FA handover determiner, a data rate determiner, and a handover determiner. The ranging response counter counts the number of ranging response messages that are received during one period of periodic ranging. The load estimator estimates a cell load on the basis of the number of the ranging response messages. The FA handover determiner determines an FA handover on the basis of the cell load from the load estimator. The data rate determiner controls a data rate of a service on the basis of the cell load from the load estimator and requests the controlled data rate to the system. The handover determiner controls handover parameters on the basis of the cell load from the load estimator.

21 Claims, 6 Drawing Sheets

APPARATUS AND METHOD FOR ESTIMATING CELL LOAD IN WIRELESS COMMUNICATION SYSTEM

CROSS-REFERENCE TO RELATED APPLICATION(S) AND CLAIM OF PRIORITY

This application the benefit priority under 35 U.S.C. §119 of a Korean patent application filed in the Korean Intellectual Property Office on Oct. 16, 2007 and assigned Serial No. 2007-103902, the entire disclosure of which is hereby incorporated by reference.

TECHNICAL FIELD OF THE INVENTION

The present invention relates to an apparatus and method for estimating a cell load in a communication system. More particularly, the present invention relates to an apparatus and method for actively controlling communication states by using a cell load estimated by a user terminal.

BACKGROUND OF THE INVENTION

As known in the art, communication systems were originally developed to provide voice communication services. As technology has evolved, communication systems now provide data services and various multimedia services in addition to the voice communication services. However, conventional communication systems, which were developed to provide voice communication services, have a narrow bandwidth for data transmission and require a high subscription fee, thus failing to satisfy diversified user demands. Furthermore, in conjunction with the rapid development in the communication industry and ever-increasing demands for Internet services, it is important to provide communication systems capable of providing Internet services efficiently. As a result of these trends, broadband wireless communication systems have been proposed to provide efficient Internet services.

Broadband wireless communication systems use an Orthogonal Frequency Division Multiplexing (OFDM)/Orthogonal Frequency Division Multiple Access (OFDMA) scheme. Thus, broadband wireless communication systems can provide high-rate data transmission by transmitting physical channel signals using a number of subcarriers. The standardization of wireless access schemes for broadband wireless communication systems is being conducted by the Institute of Electrical and Electronics Engineers (IEEE), which is an international standardization organization, particularly by the IEEE 802.16 standardization group.

Ranging is a kind of random access process in a broadband wireless communication system. The ranging process is used to control time/frequency offsets between a base station (BS) and a user terminal and to correct the transmission (TX) power of the user terminal. The ranging process can be divided into initial ranging, periodic ranging, bandwidth request ranging, and handover ranging, depending on the purpose.

A ranging code (or code set) used in each ranging process is broadcast using an Uplink Channel Descriptor (UCD) message. A user terminal attempts ranging by transmitting an intended ranging code through a ranging region detected from an uplink MAP (UL-MAP) message. A base station uses the received ranging code to calculate time/frequency offsets, and transmits a RaNGing ReSPonse (RNG-RSP) message containing an offset correction value to the user terminal. That is, through a code ranging process, the user terminal corrects physical time/frequency offsets with the base station.

The ranging code transmitted by the user terminal in the ranging process is called a Code Division Multiple Access (CDMA) code. The CDMA code is generated by a pseudo random binary sequence (PRBS) generator.

If a base station supports a plurality of frequency assignments (FAs), loads may be considerably different between FAs. If loads are considerably different between FAs, the system needs to balance a cell load, and a user terminal needs to move to a small-load FA in order to secure a good service quality. Cell load estimation is essential for such cell load balancing. However, in the conventional art, cell load estimation is performed unilaterally by the base station, and a user terminal only operates under the control of the base station.

If a user terminal can estimate a cell load actively, the user terminal can control communication states more actively on the basis of the estimated cell load.

However, the conventional user terminal cannot control communication states more actively because it cannot estimate a cell load by itself.

SUMMARY OF THE INVENTION

To address the above-discussed deficiencies of the prior art, it is a primary object of the present invention to address at least the above-mentioned problems and/or disadvantages and to provide at least the advantages below. Accordingly, an aspect of the present invention is to provide an apparatus and method for a user terminal to estimate a cell load in a wireless communication system.

Another aspect of the present invention is to provide an apparatus and method for a user terminal to estimate a cell load in a wireless communication system on the basis of the number of ranging responses.

Still another aspect of the present invention is to provide an apparatus and method for a user terminal to determine an FA handover in a wireless communication system on the basis of a cell load.

Still another aspect of the present invention is to provide an apparatus and method for a user terminal to determine a data rate in a wireless communication system on the basis of a cell load.

Still another aspect of the present invention is to provide an apparatus and method for a user terminal to control a handover time in a wireless communication system on the basis of a cell load.

Still another aspect of the present invention is to provide an apparatus and method for a user terminal to estimate a link state in a wireless communication system on the basis of the number of ranging responses.

Still another object of the present invention is to provide an apparatus and method for a user terminal to adaptively control a ranging timer value in a wireless communication system on the basis of the number of ranging responses.

According to an aspect of the present invention, a method of operating a user terminal in a wireless communication system is provided. The method includes counting the number of ranging response messages that are received during one period of periodic ranging, and estimating a cell load on the basis of the number of the ranging response messages.

The method may further include comparing the cell load with a threshold value, waiting for a random time if the cell load is greater than the threshold value, estimating a cell load again after waiting for the random time, and performing a handover to another FA if the cell load is still greater than threshold value.

The method may further include comparing the cell load with a threshold value, reducing a data rate of a service if the cell load is greater than the threshold value, and increasing a data rate of a service if the cell load is smaller than the threshold value.

The method may further include comparing the cell load with a threshold value, and controlling handover parameters if the cell load is greater than the threshold value.

The method may further include operating a response wait timer after transmission of a ranging code, detecting the number of ranging response messages for other user terminals received during the operation of the response wait timer, and updating the expiry time of the response wait timer if the number of the ranging response messages for the other user terminals reaches a predetermined value.

According to anther aspect of the present invention, an apparatus of a user terminal in a wireless communication system is provided. The apparatus includes a ranging response counter for counting the number of ranging response messages that are received during one period of periodic ranging, and a load estimator for estimating a cell load on the basis of the number of the ranging response messages.

The apparatus may further include an FA handover determiner for determining an FA handover on the basis of the cell load from the load estimator.

The apparatus may further include a data rate determiner for controlling a data rate of a service on the basis of the cell load from the load estimator and requesting the controlled data rate to the system.

The apparatus may further include a handover determiner for controlling handover parameters on the basis of the cell load from the load estimator.

Other aspects, advantages, and salient features of the invention will became apparatus to skilled in the art from the following detailed description, which, taken in conjunction with the annexed drawings, discloses exemplary embodiments of the invention.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION OF THE INVENTION

FIGS. 1 through 6, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged wireless communication system.

Exemplary embodiments of the present invention are intended to provide a scheme for a user terminal itself to estimate a cell load (i.e., a system load) in a broadband wireless communication system.

The following description is made in the context of an OFDM/OFDMA-based broadband wireless communication system. However, it is to be understood that this is merely for the sake of the convenience and that the present invention is not limited to an OFDM-based system. Thus, it should be clearly understood that the present invention is also applicable to any other communication system that requires load estimation.

In case of periodic ranging, all user terminals transmit ranging codes in the same period, and the number of ranging responses received during one period can be regarded as the number of user terminals accessing the system. That is, load estimation can be performed using the number of ranging response messages in periodic ranging.

Also, the number of the ranging response messages can be used to determine the channel conditions of a downlink and an uplink, as well as to estimate a cell load. If a user terminal transmits a ranging code to a base station and then continues to receive a response for another user terminal, not a response for the ranging code transmitted by the user terminal itself, the user terminal can determine that the base station has failed to receive the ranging code due to the poor uplink conditions of the user terminal itself. In this case, it is preferable that the user terminal reattempts code ranging as soon as possible.

Thus, the present invention is intended to enable a user terminal to estimate a cell load on the basis of the number of ranging responses and to control communication states (e.g., determination of an inter-FA handover, determination of a handover time, and determination of a service data rate). Also, the present invention is intended to allow the user terminal to adaptively control a ranging timer value (e.g., T3 timer and T4 timer) on the basis of the number of ranging responses.

Figure 1:
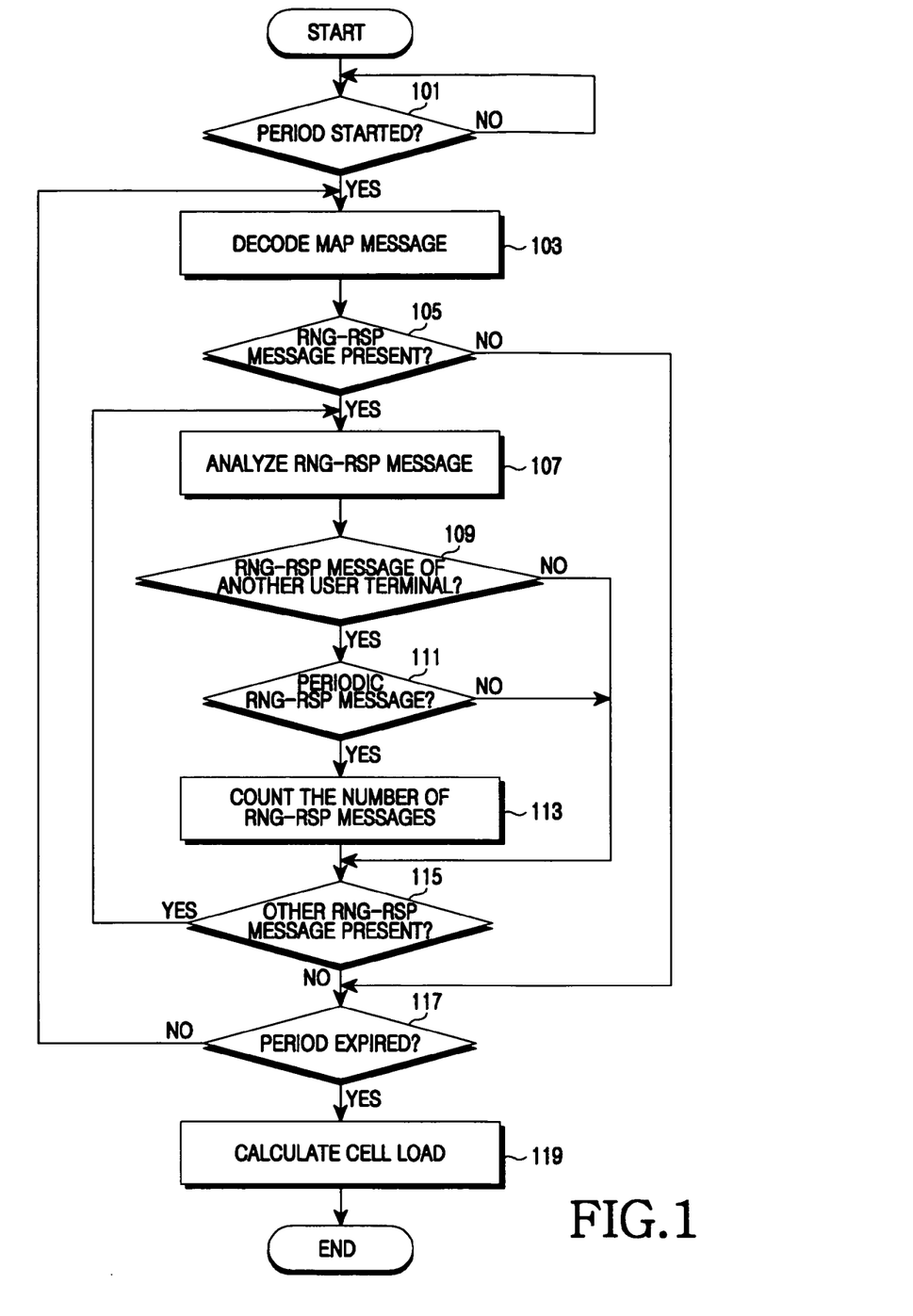
FIG. 1 is a flow chart illustrating a process for estimating a cell load of a user terminal in a broadband wireless communication system according to an exemplary embodiment of the present invention.

FIG. 1 is a flow chart illustrating a process for estimating a cell load of a user terminal in a broadband wireless communication system according to an exemplary embodiment of the present invention.

Referring to FIG. 1, if cell load estimation is necessary, the user terminal detects whether a period of periodic ranging starts, in step 101. If the start of the period is detected (in step 101), the user terminal proceeds to step 103. In step 103, the user terminal decodes a MAP message of the current frame. Herein, the MAP message includes resource assignment information (i.e., MAP information Element (MAP_IE)), and the user terminal can determine a burst (or a message), which is to be received by the user terminal itself, by decoding the MAP message.

In step 105, on the basis of the decoding results of the MAP message, the user terminal determines whether a ranging response (RNG-RSP) message is present in the current frame. If a ranging response message is not present in the current frame (in step 105), the user terminal proceeds to step 117 to determine whether the period expires. If a ranging response message is present in the current frame (in step 105), the user terminal proceeds to step 107. In step 107, the user terminal analyzes the ranging response message received in the current frame.

In step 109, the user terminal determines whether the analyzed ranging response message is a ranging response message for another user terminal. Generally, in case of code ranging, a base station cannot know a user terminal transmitting a ranging code. Therefore, upon detection of the ranging code, the base station broadcasts a ranging response message containing information about the detected ranging code and information about a slot where the ranging code is detected. Thus, by detecting the ranging code information and the slot information contained in the ranging response message, the user terminal can determine whether the ranging response message is a response for the ranging code transmitted by the user terminal itself.

If the analyzed ranging response message is not a ranging response message for another user terminal (in step 109), the user terminal proceeds to step 115 to determine whether another ranging response message is present. If the analyzed ranging response message is a ranging response message for another user terminal (in step 109), the user terminal proceeds to step 111. In step 111, on the basis of the ranging code information in the ranging response message, the user terminal determines whether the analyzed ranging response message is a ranging response message for periodic ranging. In general, the system classifies available ranging codes into a plurality of code sets and uses the respective code sets for different purposes. Thus, the user terminal can determine the ranging type of the corresponding ranging response message by determining the code set including the ranging code written in the ranging response message.

If the analyzed ranging response message is not a ranging response message for periodic ranging (in step 111), the user terminal proceeds to step 115. If the analyzed ranging response message is a ranging response message for periodic ranging (in step 111), the user terminal proceeds to step 113. In step 113, the user terminal counts the number of ranging response messages. In step 115, the user terminal determines whether another ranging response message is present in the current frame. If another ranging response message is present in the current frame (in step 115), the user terminal returns to step 107 to analyze the other ranging response message.

If another ranging response message is not present in the current frame (in step 115), the user terminal proceeds to step 117. In step 117, the user terminal detects whether the period expires. If the expiry of the period is not detected (in step 117), the user terminal returns to step 103 to receive the next frame and then perform the subsequent steps. If the expiry of the period is detected (in step 117), the user terminal proceeds to step 119. In step 119, the user terminal determines a cell load on the basis of the number of ranging response messages that is counted during one period of the periodic ranging.

As described above, the user terminal counts the number of periodic ranging response messages for other user terminals during one period of the periodic ranging and determines the counted number of ranging response messages as a cell load. The user terminal controls communication states more actively on the basis of the determined ranging response message number (i.e., the cell load). Hereinafter, a control operation based on the cell load will be described in detail with reference to FIGS. 2 through 5.

Figure 2:
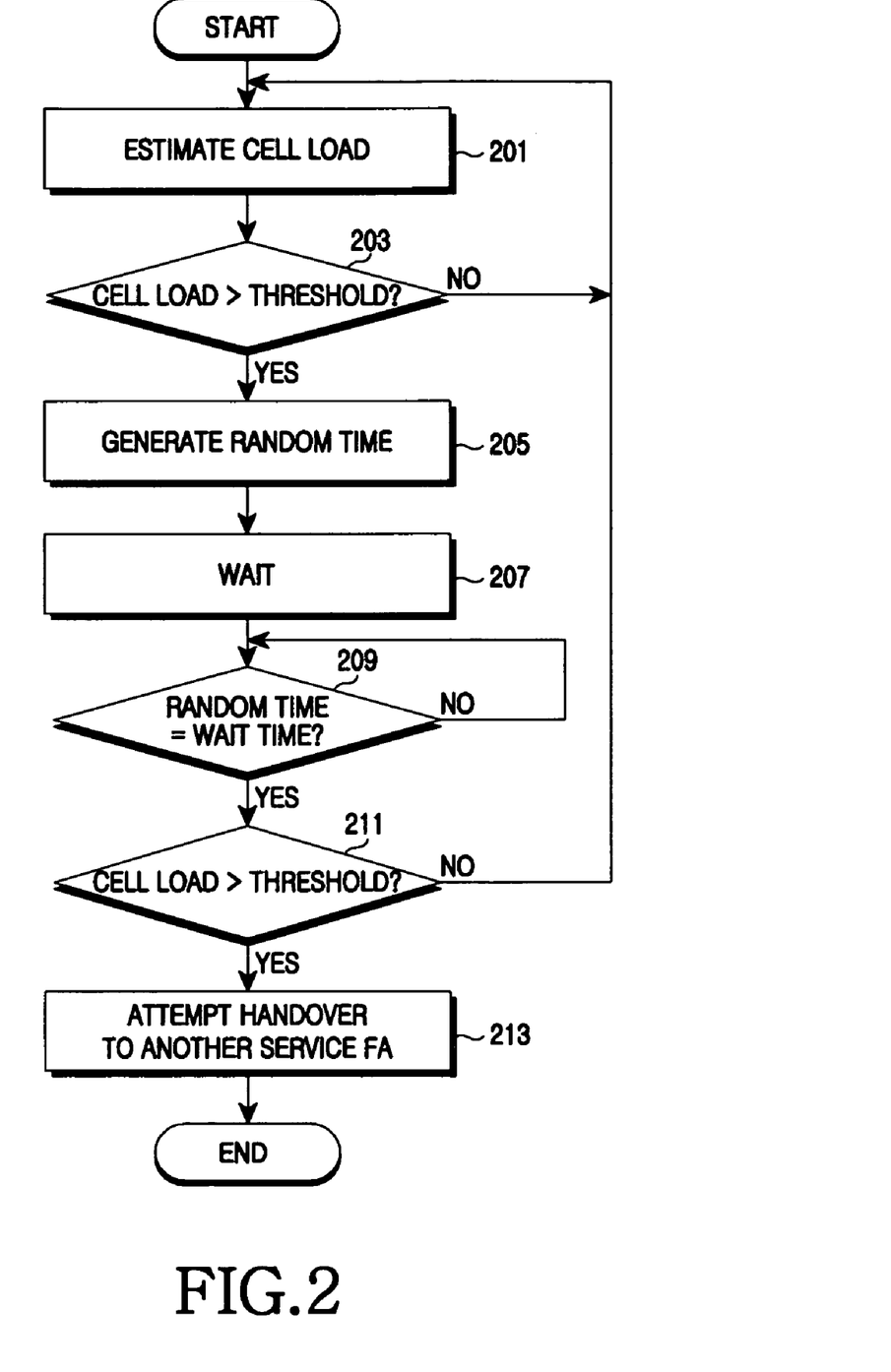
FIG. 2 is a flow chart illustrating a process for determining an FA handover of a user terminal in a broadband wireless communication system according to an exemplary embodiment of the present invention.

FIG. 2 is a flow chart illustrating a process for determining an FA handover of a user terminal in a broadband wireless communication system according to an exemplary embodiment of the present invention.

Referring to FIG. 2, in step 201, the user terminal estimates a cell load on the basis of the number of periodic ranging response messages received through the period of periodic ranging. Herein, the cell load may be estimated as illustrated in FIG. 1.

In step 203, the user terminal determines whether the cell load is greater than a preset threshold value. If the cell load is smaller than or equal to the threshold value (in step 203), the user terminal returns to step 201 to again estimate a cell load. If the cell load is greater than the threshold value (in step 203), the user terminal proceeds to step 205. In step 205, the user terminal generates a random time. In step 207, the user terminal waits and counts a wait time.

In step 209, the user terminal determines whether the random time is equal to the wait time. If the random time is equal to the wait time (in step 209), the user terminal proceeds to step 211. In step 211, the user terminal estimates a cell load again and determines whether the cell load is greater than the threshold value.

If the cell load is still greater than the threshold value (in step 211), the user terminal proceeds to step 213. In step 213, the user terminal determines that a load of the current FA is large, and attempts to access another FA. On the other hand, if the cell load is smaller than or equal to the threshold value (in step 211), the user terminal returns to step 201 to again estimate a cell load.

As described above, the user terminal waits for a random time and then determines a cell load again in order to prevent all the user terminals in the cell from simultaneously performing an FA handover at the time when the cell load exceeds the threshold value. Also, because the final determination on the FA handover request of the user terminal is performed by the system, a complementary operation is possible between the user terminal and the system. In this way, the user terminal determines a cell load by itself to request an FA handover to the base station. Herein, the contention possibility of several user terminals attempting an FA handover simultaneously is solved by a randomization technique, and the final determination is performed by the system, thereby facilitating system stabilization.

Figure 3:
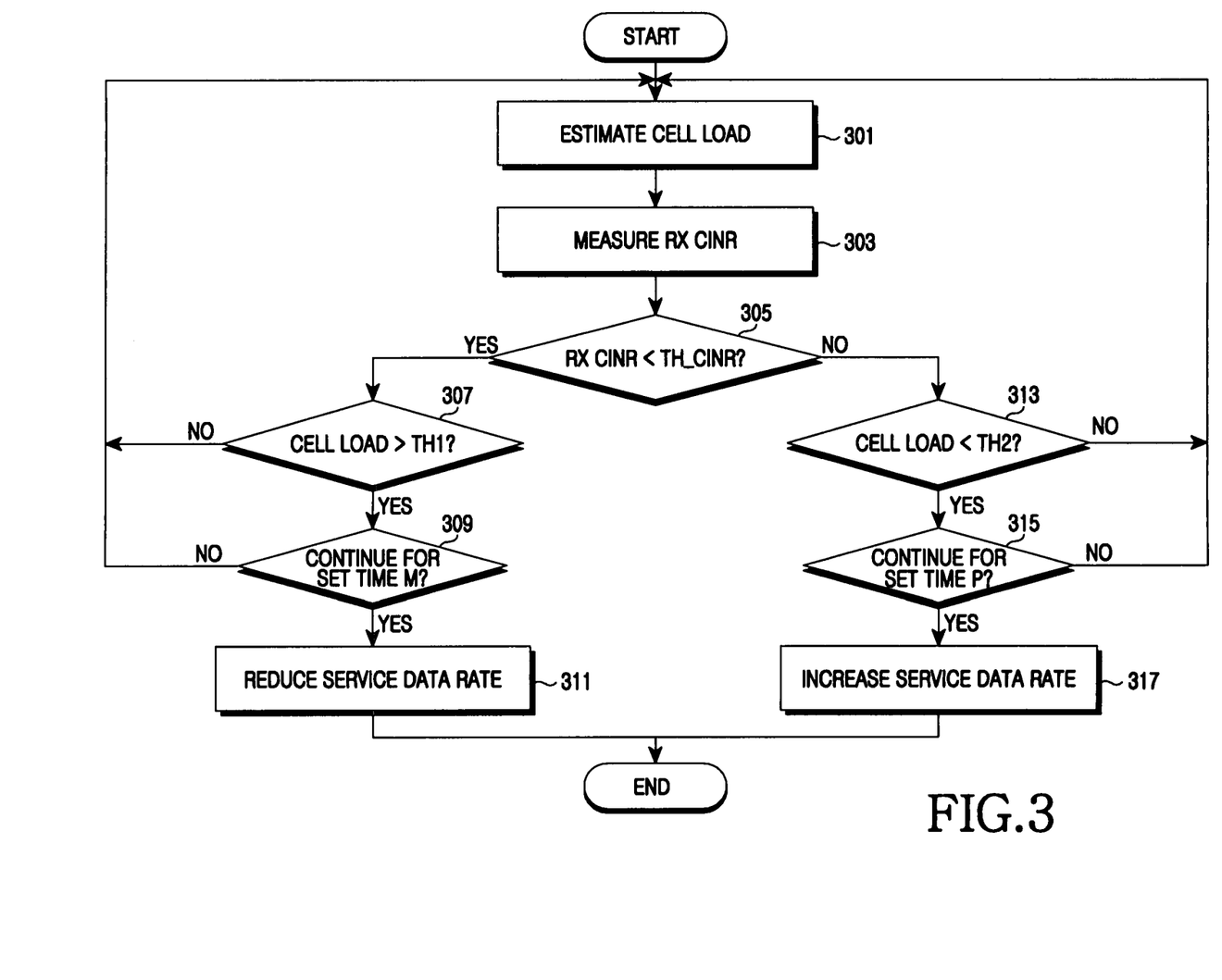
FIG. 3 is a flow chart illustrating a process for controlling a data rate of a user terminal in a broadband wireless communication system according to an exemplary embodiment of the present invention.

FIG. 3 is a flow chart illustrating a process for controlling a data rate of a user terminal in a broadband wireless communication system according to an exemplary embodiment of the present invention.

Referring to FIG. 3, in step 301, the user terminal estimates a cell load on the basis of the number of periodic ranging response messages received during the period of periodic ranging. Herein, the cell load may be estimated as illustrated in FIG. 1.

In step 303, the user terminal estimates a receive (RX) Carrier-to-Interference plus Noise Ratio (CINR). In step 305, the user terminal determines whether the estimated CINR is smaller than a preset threshold value TH_CINR.

If the estimated RX CINR is smaller than the threshold value TH_CINR (in step 305), the user terminal proceeds to step 307. In step 307, the user terminal determines whether the cell load is greater than a first threshold value TH1. If the cell load is smaller than or equal to the first threshold value TH1 (in step 307), the user terminal returns to step 301 to again estimate a cell load. If the cell load is greater than the first threshold value TH1 (in step 307), the user terminal proceeds to step 309. In step 309, the user terminal determines whether a state of the RX CINR being smaller than the threshold value TH_CINR and the cell load being greater than the first threshold value TH1 continues for a preset time M. If the state does not continue for the preset time M (in step 309), the user terminal returns to step 301 to again estimate a cell load. If the state continues for the preset time M (in step 309), the user terminal proceeds to step 311. In step 311, the user terminal reduces a data rate of a current service (e.g., a VOD service) and requests the reduced data rate to the system.

If the estimated CINR is greater than or equal to the threshold value TH_CINR (in step 305), the user terminal proceeds to step 313. In step 313, the user terminal determines whether the cell load is less than a second threshold value TH2. If the cell load is greater than or equal to the second threshold value TH2 (in step 313), the user terminal returns to step 301 to again estimate a cell load. If the cell load is less than the second threshold value TH2 (in step 313), the user terminal proceeds to step 315. In step 315, the user terminal determines whether a state of the RX CINR being greater than the threshold value TH_CINR and the cell load being less than the second threshold value TH2 continues for a preset time P. If the state does not continue for the preset time P (in step 315), the user terminal returns to step 301 to again estimate a cell load. If the state continues for the preset time P (in step 315), the user terminal proceeds to step 317. In step 317, the user terminal increases a data rate of the current service and requests the increased data rate to the system.

As described above, the user terminal determines a cell load by itself to control a service data rate. If the system load is small, the user terminal increases a data rate to receive a high-speed or high-quality service; and if the system load is large, the user terminal reduces a data rate because it is more important to receive a seamless service rather than a high-quality service. In the embodiment of FIG. 3, the first threshold value TH1 and the second threshold value TH2 may be equal to or different from each other. Also, the preset period M and the preset period P may be equal to or different from each other. That is, the preset parameters may vary depending on an operator's or designer's intentions.

Figure 4:
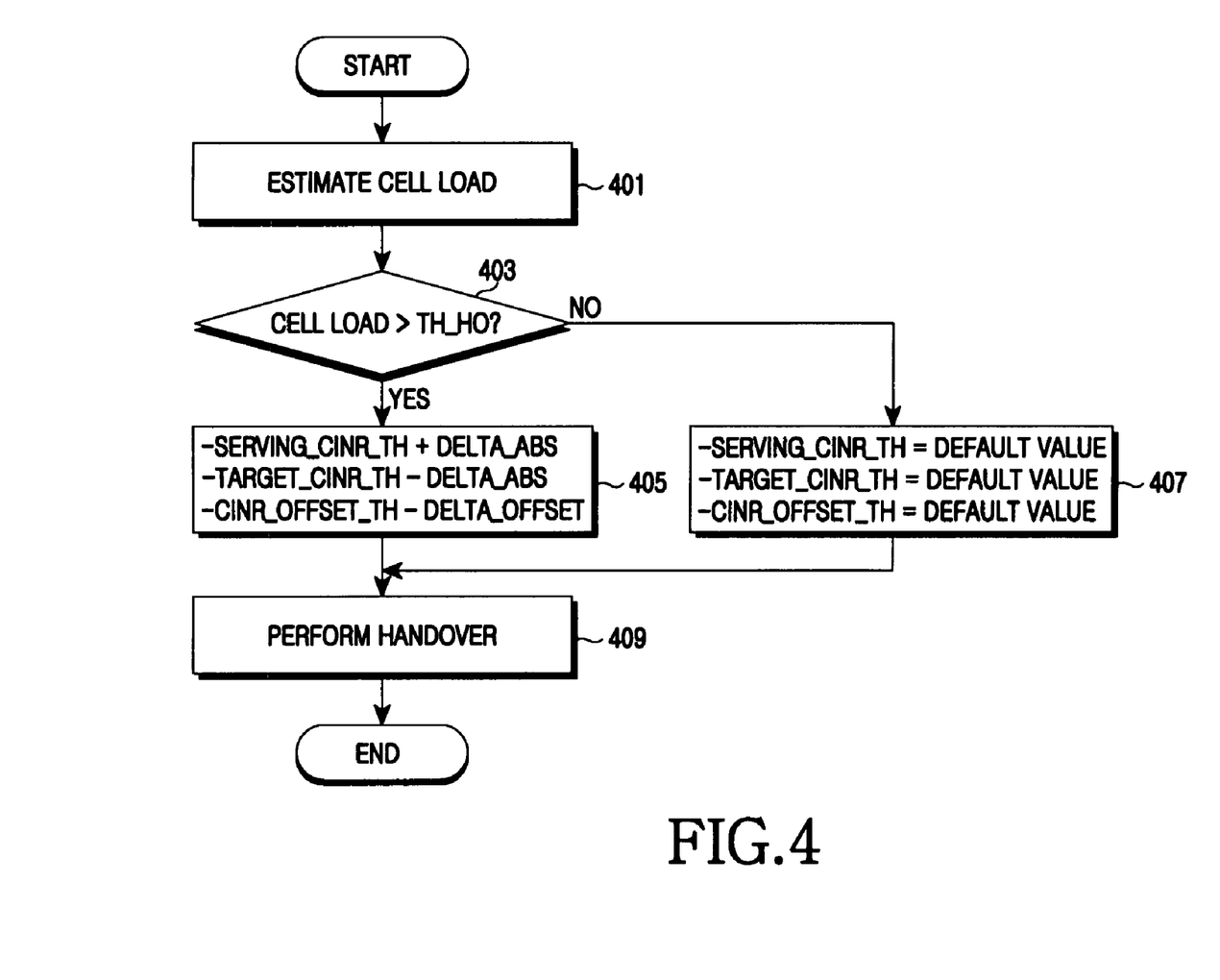
FIG. 4 is a flow chart illustrating a process for controlling a handover time of a user terminal in a broadband wireless communication system according to an exemplary embodiment of the present invention.

FIG. 4 is a flow chart illustrating a process for controlling a handover time of a user terminal in a broadband wireless communication system according to an exemplary embodiment of the present invention.

Referring to FIG. 4, in step 401, the user terminal estimates a cell load on the basis of the number of periodic ranging response messages received during the period of periodic ranging. Herein, the cell load may be estimated as illustrated in FIG. 1.

In step 403, the user terminal determines whether the cell load is greater than a preset threshold value TH_HO.

If the cell load is greater than the threshold value TH_HO (in step 403), the user terminal proceeds to step 405. In step 405, the user terminal controls handover parameter values. A handover may be initiated by the user terminal or a base station. Hereinafter, it is assumed that the handover is initiated by the user terminal. The user terminal may request a handover to the base station if a CINR value of a serving base station is smaller than a first threshold value SERVING_CINR_TH, if a CINR value of a target base station is greater than a second threshold value TARGET_CINR_TH, or if a difference between the CINR value of the serving base station and the CINR value of the target base station is greater than a third threshold value CINR_OFFSET_TH. The present invention is intended to control the above parameters SERVING_CINR_TH, TARGET_CINR_TH and CINR_OFFSET_TH, which are used to determine a handover time, according to a cell load. If a load of the serving base station is large, the handover time may be advanced by controlling the handover parameters.

That is, if a cell load of the serving base station is large, the user terminal controls at least one of the three threshold values in order to advance the handover time. Herein, the first threshold value may be increased by a preset delta value DELTA_ABS; the second threshold value may be reduced by a preset delta value; and the third threshold value may be reduced by a preset delta value.

In step 409, on the basis of the set handover parameters, the user terminal determines whether to perform a handover. If the cell load is smaller than or equal to the threshold value TH_HO (in step 403), the user terminal proceeds to step 407. In step 407, the user terminal sets the handover parameters to default values (or initial values). In step 409, the user terminal performs a handover.

As described above, the user terminal determines a load of the serving base station by itself to actively control the handover time.

As described above, for a ranging operation, the user terminal transmits a ranging code and waits for a set timer time to receive a ranging response message. If a ranging response message is not received for the set timer time, the user terminal retransmits a ranging code. During the waiting operation, the user terminal interprets all the received ranging response messages and discards a ranging response message if the ranging response message is not a response for the ranging code transmitted by the user terminal itself. At this point, if the user terminal fails to receive its own response message while receiving a ranging response message for another user terminal, the following two cases may be assumed.

a) The case where the base station fails to receive a CDMA ranging code transmitted by the user terminal.

b) The case where the base station succeeds in receiving a CDMA ranging code transmitted by the user terminal, but fails to transmit a ranging response message within the timer time due to a process delay.

Herein, in the case a), it is preferable that the user terminal immediately reattempts ranging; and in the case b), it is preferable that the user terminal reattempts ranging after waiting for a preset time.

Succeeding in receiving a ranging response message for another user terminal means a good downlink channel state, and the case of succeeding in receiving a response for another user terminal while failing to receive its own response may assume the case a) rather than the case b). That is, if the user terminal transmits a ranging code to a base station and then continues to receive a response for another user terminal, not a response for the ranging code transmitted by the user terminal itself, it may determine that the base station failed to receive the ranging code due to a poor uplink state of the user terminal itself. In this case, it is preferable that the user terminal reattempts code ranging as soon as possible. This will be described below in detail with reference to the drawings.

Figure 5:
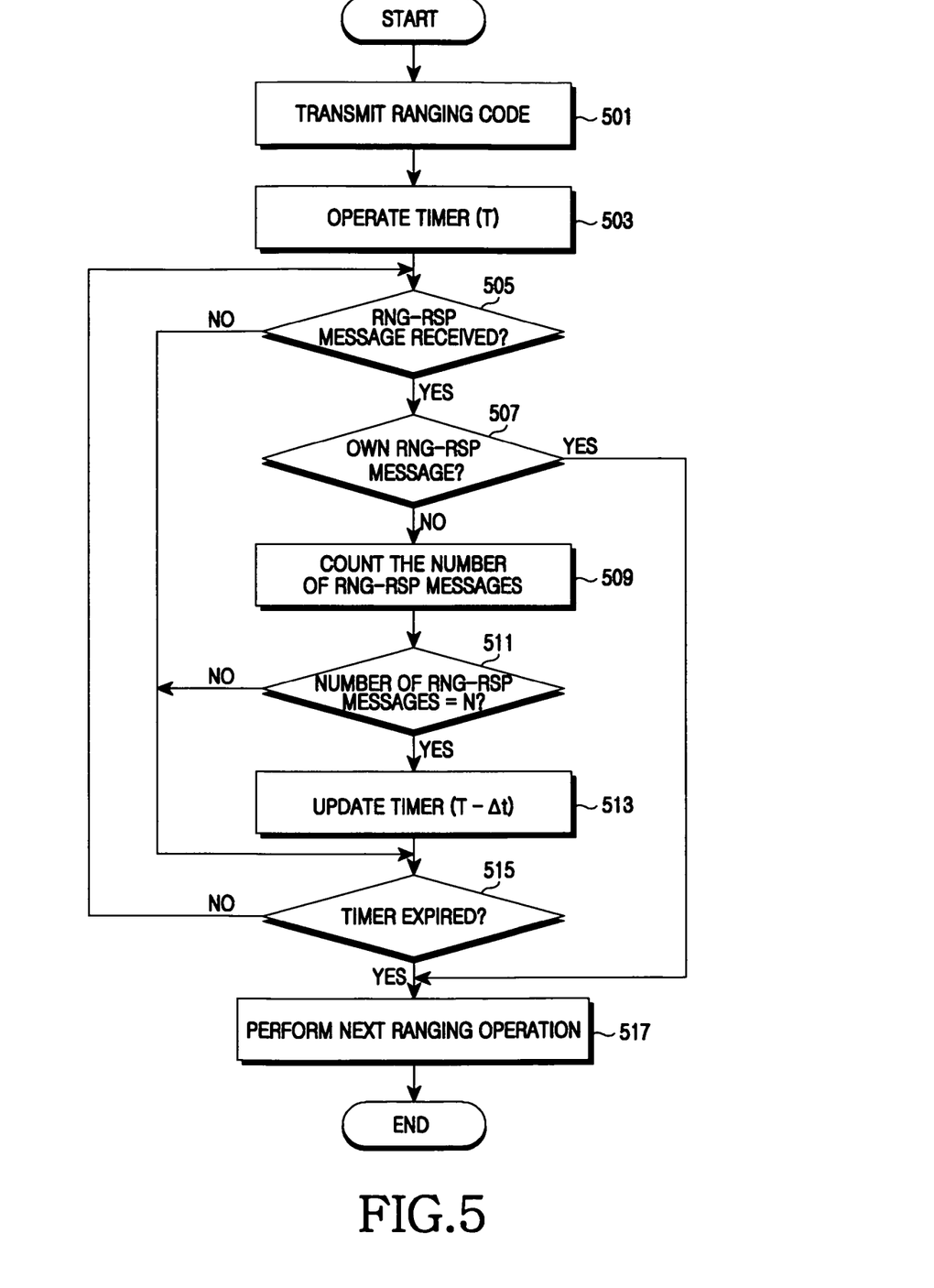
FIG. 5 is a flow chart illustrating a process for controlling a ranging timer of a user terminal in a broadband wireless communication system according to an exemplary embodiment of the present invention.

FIG. 5 is a flow chart illustrating a process for controlling a ranging timer of a user terminal in a broadband wireless communication system according to an exemplary embodiment of the present invention. FIG. 5 is applicable to all the ranging processes (e.g., initial ranging, periodic ranging, handover ranging, and bandwidth request ranging). The following description will be made in the context of periodic ranging to which the present invention is not limited.

Referring to FIG. 5, in step 501, the user terminal selects one among a set of periodic ranging codes and transmits the selected ranging code to a base station through a predetermined region (e.g., resources or slots). In step 503, the user terminal operates a timer T and waits for a response message for the ranging code until the timer expires.

In step 505, the user terminal determines whether a ranging response message is received from the base station. Herein, the ranging response message is a broadcast message that can be received by all the user terminals. If the ranging response message is not received (in step 505), the user terminal proceeds to step 515 to detect whether the timer expires. If the ranging response message is received (in step 505), the user terminal proceeds to step 507. In step 507, the user terminal determines whether the received ranging response message is a ranging response message for the ranging code transmitted by the user terminal itself. Generally, in case of code ranging, a base station cannot know a user terminal uploading a ranging code. Therefore, in response to the ranging code, the base station broadcasts a ranging response message containing information about the corresponding ranging code and information about a slot where the ranging code is detected. Thus, by detecting the ranging code information and the slot information contained in the ranging response message, the user terminal can determine whether the ranging response message is a response for the ranging code transmitted by the user terminal itself.

If the received ranging response message is a ranging response message for the ranging code transmitted by the user terminal itself (in step 507), the user terminal proceeds to step 517 to perform the next ranging operation. For example, depending on the ranging status information written in the ranging response message, the ranging code may be retransmitted or a ranging request (RNG-REQ) message may be transmitted through a region (or resource) allocated by CDMA_alloc_IE( ). If the received ranging response message is not a ranging response message for the ranging code transmitted by the user terminal itself (in step 507), the user terminal proceeds to step 509. In step 509, the user terminal counts the number of ranging response messages for other user terminals.

In step 511, the user terminal determines whether the determined number of the ranging response messages is equal to a preset value N. If the determined number of the ranging response messages is not equal to the preset value N (in step 511), the user terminal proceeds to step 515 to detect whether the timer expires. If the determined number of the ranging response messages is equal to the preset value N (in step 511), the user terminal proceeds to step 513. In step 513, the user terminal controls the expiry time of the timer. That is, if the user terminal receives a predetermined number of response messages for other user terminals, not a response message for the ranging code transmitted from the user terminal itself to the base station, it advances the timer expiry time for quick retransmission.

In step 515, the user terminal detects whether the timer expires. If the expiry of the timer is not detected (in step 515), the user terminal returns to step 505 to again perform the subsequent steps. If the expiry of the timer is detected (in step 515), the user terminal proceeds to step 517. In step 517, the user terminal performs the next ranging operation. Herein, if the ranging response message is not received until the expiry of the timer, the user terminal may retransmit the ranging code.

Not only in the step of waiting to receive the ranging response message after transmission of the ranging code, but also in other ranging steps, such as the step of waiting to receive the CDMA_Alloc_IE after receipt of the ranging response message and the step of waiting to receive the ranging response message after transmission of the ranging request (RNG-REQ) message, the RX wait timer value may be controlled according to the number of ranging response messages for other user terminals as illustrated in FIG. 5.

Figure 6:
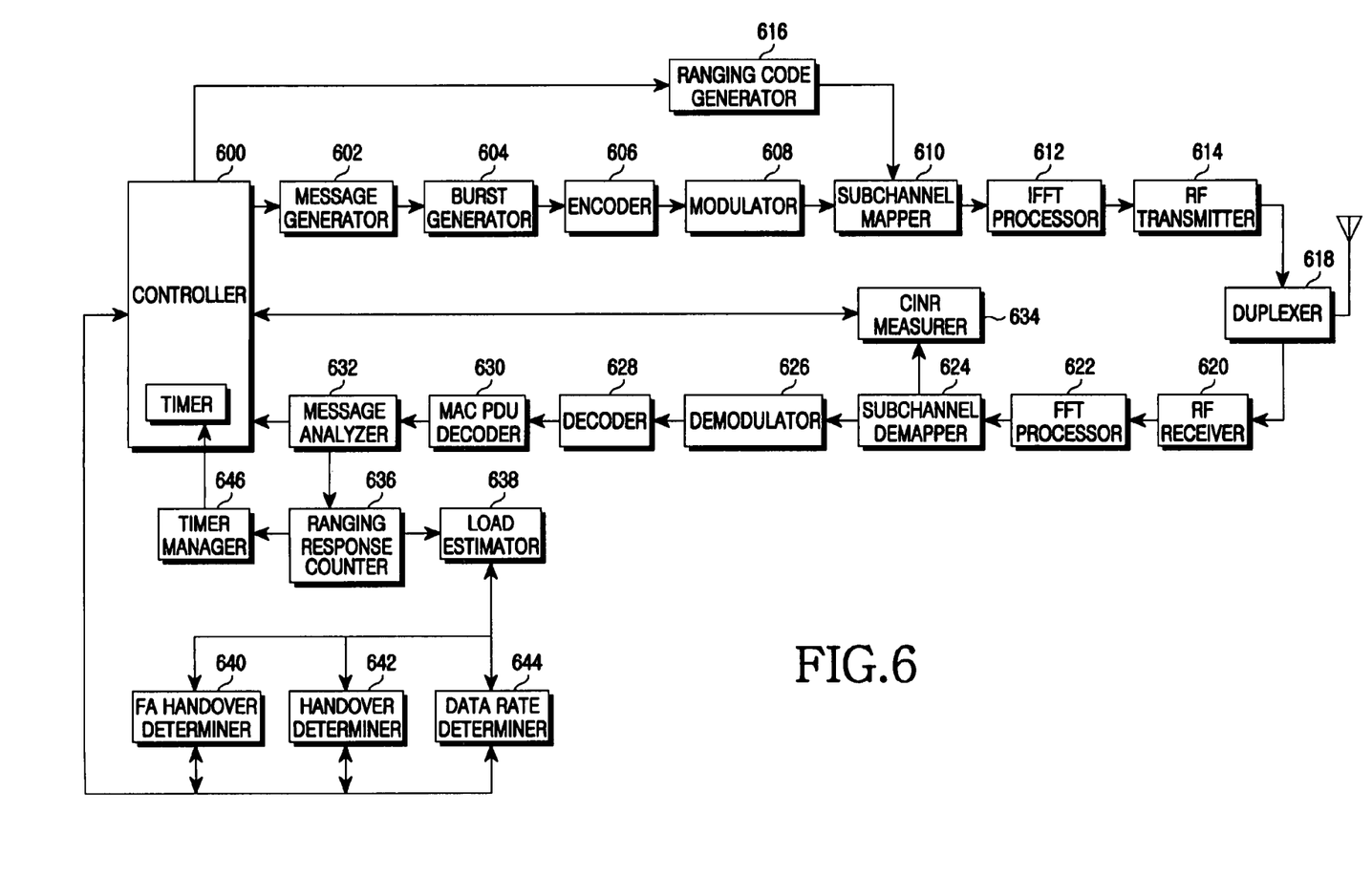
FIG. 6 is a block diagram of a user terminal in a broadband wireless communication system according to an exemplary embodiment of the present invention.

FIG. 6 is a block diagram of a user terminal in a broadband wireless communication system according to an exemplary embodiment of the present invention.

Referring to FIG. 6, the user terminal includes a controller 600, a message generator 602, a burst generator 604, an encoder 606, a modulator 608, a subchannel mapper 610, an Inverse Fast Fourier Transform (IFFT) processor 612, a radio frequency (RF) transmitter 614, a ranging code generator 616, a duplexer 618, an RF receiver 620, a Fast Fourier Transform (FFT) processor 622, a subchannel demapper 624, a demodulator 626, a decoder 628, a Media Access Control (MAC) Packet Data Unit (PDU) decoder 630, a message analyzer 632, a CINR measurer 634, a ranging response counter 636, a load estimator 638, an FA handover determiner 640, a handover determiner 642, a data rate determiner 644, and a timer manager 646.

The controller 600 controls an overall operation of the user terminal. For example, in accordance with a prescribed protocol, the controller 600 orders generation of a signaling message (e.g., a MAC management message) and controls the user terminal according to the contents of a received signaling message. Also, it is assumed that the controller 600 manages resource scheduling and processes data of an upper protocol layer (e.g., an IP layer).

The message generator 602 generates MAC PDUs (i.e., a MAC message) using traffic or control information received from the controller 600. The burst generator 604 generates a physical-layer burst using the MAC PDUs from the message generator 602. The encoder 606 encodes the burst from the burst generator 604 according to a Modulation and Coding Scheme (MCS) level. The modulator 608 modulates the data from the encoder 606 according to an MCS level.

If coding ranging is required, the controller 600 orders the ranging code generator 616 to generate a ranging code. The ranging code generator 616 randomly selects a code from a code set according to the ranging type, and provides the selected code to the subchannel mapper 610.

The subchannel mapper 610 subcarrier-maps the burst from the modulator 608 and the ranging code from the ranging code generator 616. The IFFT processor 612 IFFT-processes the data from the subchannel mapper 610 to generate sample data, and inserts a guard interval (e.g., a cyclic prefix) into the sample data. The RF transmitter 614 converts the sample data from the IFFT processor 612 into an analog signal, converts the analog signal into an RF signal, and transmits the RF signal through an antenna.

After transmission of the ranging code, the controller 600 operates a timer and waits a ranging response message until the timer expires.

According to a duplexing scheme, the duplexer 618 transmits a TX signal from the RF transmitter 614 through the antenna and provides an RX signal from the antenna to the RF receiver 620. The RF receiver 620 receives an RF signal and converts the RF signal into a baseband signal. The FFT processor 622 receives baseband sample data from the RF receiver 620, removes a guard interval (e.g., a cyclic prefix) from the baseband sample data, and FFT-processes the resulting data to output frequency-domain data.

The subchannel demapper 624 extracts a burst from the frequency-domain data from the FFT processor 622 and provides the burst to the demodulator 626. Also, the subchannel demapper 624 extracts a preamble signal (or a pilot signal) from the frequency-domain data and provides the preamble signal (or the pilot signal) to the CINR measurer 634. The CINR measurer 634 measures a CINR using the preamble signal (or the pilot signal) and provides the CINR to the controller 600.

The demodulator 626 demodulates the burst from the subchannel demapper 624 according to an MSC level. The decoder 628 decodes the data from the demodulator 626 according to the MCS level.

The MAC PDU decoder 630 extracts MAC PDUs from the burst from the decoder 628 and performs a header/error check for each MAC PDU. Herein, a payload type (traffic or signaling) is determined through the header check. If the data from the MAC PDU decoder 630 is signaling, the message analyzer 632 analyzes a message and provides the results to the controller 600; and if the data from the MAC PDU decoder 630 is traffic, the message analyzer 632 provides a payload to the controller 600.

According to an exemplary embodiment of the present invention, when ranging response messages are received, the message analyzer 632 notifies the ranging response counter 636 of the ranging response message under the control of the controller 600. The ranging response counter 636 counts the number of the ranging response messages and provides the counted ranging response message number to the load estimator 638 under the control of the controller 600. Herein, the ranging response counter 636 may count the number of ranging response messages of other user terminals that are received during one period of periodic ranging. The load estimator 638 estimates a cell load on the basis of the number of counted ranging response message from the ranging response counter 636 and provides the estimated cell load to the FA handover determiner 640, the handover determiner 642, or the data rate determiner 644. Herein, the load estimator 638 may determine the number of counted ranging response message as the cell load without conversion.

The FA handover determiner 640 determines an FA handover on the basis of the cell load from the load estimator 638 and notifies the determination of the FA handover to the controller 600. Herein, the FA handover determiner 640 may determine the FA handover as illustrated in FIG. 2.

The handover determiner 642 controls handover parameters on the basis of the cell load from the load estimator 638, determines the necessity of a handover on the basis of the controlled handover parameters, and provides the determination to the controller 600. Herein, the handover determiner 642 may control the handover parameters as illustrated in FIG. 4.

The data rate determiner 644 controls a data rate of a service on the basis of the cell load from the load estimator 638, and provides the controlled data rate to the controller 600. Herein, the data rate determiner 644 may control the data rate as illustrated in FIG. 3.

The timer manager 646 controls the expiry time of a ranging timer on the basis of the number of ranging response message from the ranging response counter 636, and resets (or updates) a timer in the controller 600 according to the control result. If the user terminal receives a predetermined number of response messages for other user terminals, not a response message for the ranging code transmitted from the user terminal itself to a base station, the timer manager 646 advances the expiry time of the timer by a preset value.

According to an exemplary embodiment of the present invention as described above, the user terminal can estimate a system load (or cell load) by itself and control communication states more actively on the basis of the system load. For example, the user terminal can determine an FA handover, a data rate, and a handover time more actively on the basis of the system load. Therefore, the user terminal can be provided with the best service quality, and the system can provide the best service to the user terminal.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A method of operating a user terminal in a wireless communication system, the method comprising:
    counting, at a ranging response counter of the user terminal, a number of ranging response messages that are received during one period of periodic ranging; and
    estimating, at a load estimator of the user terminal, a cell load on the basis of the number of the ranging response messages.

2. The method of claim 1, wherein counting the number of the ranging response messages comprises:
    determining whether one or more ranging response messages are received during one period of periodic ranging;
    determining, upon receipt of the one or more ranging response messages, whether the received ranging response messages are periodic ranging response messages for other user terminals; and
    counting a number of the received ranging response messages that are periodic ranging response messages for other user terminals.

3. The method of claim 1, further comprising:
    comparing the cell load with a threshold value;
    waiting for a random time if the cell load is greater than the threshold value;
    estimating a cell load again after waiting for the random time; and
    performing a handover to another frequency assignment (FA) if the cell load is still greater than threshold value after waiting for the random time.

4. The method of claim 1, further comprising:
    comparing the cell load with a threshold value;
    reducing a data rate of a service if the cell load is greater than the threshold value; and
    increasing a data rate of a service if the cell load is smaller than or equal to the threshold value.

5. The method of claim 1, further comprising:
    measuring a receive (RX) signal strength;
    reducing a data rate of a service if the RX signal strength is smaller than a first threshold value and the cell load is larger than a second threshold value;

increasing a data rate of a service if the RX signal strength is greater than a third threshold value and the cell load is smaller than a fourth threshold value; and
requesting the reduced/increased data rate to the system.

6. The method of claim 5, wherein the service data rate is reduced/increased if the corresponding conditions continue for a preset time.

7. The method of claim 5, wherein the RX signal strength is one of a Carrier-to-Interference plus Noise Ratio (CINR), a Received Signal Strength Indicator (RSSI), a Signal-to-Noise Ratio (SNR), and a Signal-to-Interference plus Noise Ratio (SINR).

8. The method of claim 1, further comprising:
comparing the cell load with a threshold value; and
controlling one or more handover parameters if the cell load is greater than the threshold value.

9. The method of claim 8, wherein the handover parameters are at least one of a handover reference value for the RX strength of a serving cell, a handover reference value for the RX strength of a target cell, and a handover reference value for a difference between the RX strength of a serving cell and the RX strength of a target cell.

10. The method of claim 1, further comprising:
operating a response wait timer after transmission of a ranging code;
detecting the number of ranging response messages for other user terminals received during the operation of the response wait timer; and
updating the expiry time of the response wait timer if the number of the ranging response messages for the other user terminals reaches a preset value.

11. The method of claim 10, further comprising:
terminating the operation of the response wait timer and performing a next ranging operation if a ranging response message for the transmitted ranging code is received during the operation of the response wait timer; and
retransmitting the ranging code if a ranging response message for the ranging code is not received before the expiry of the response wait timer.

12. The method of claim 10, wherein the ranging code is one of a periodic ranging code, an initial ranging code, a handover ranging code, and a bandwidth request ranging code.

13. An apparatus of a user terminal in a wireless communication system, the apparatus comprising:
a ranging response counter configured to count a number of ranging response messages that are received during one period of periodic ranging; and
a load estimator configured to estimate a cell load on the basis of the number of the ranging response messages.

14. The apparatus of claim 13, further comprising:
a receiver for physical-layer-decoding a message received from a base station; and
a message analyzer for analyzing a message received from the receiver, and if a periodic ranging response message for another user terminal is received, notifying the ranging response counter of the ranging response message for another user terminal.

15. The apparatus of claim 13, further comprising a frequency assignment (FA) handover determiner for determining in FA handover on the basis of the cell load from the load estimator.

16. The apparatus of claim 13, further comprising a data rate determiner for controlling a data rate of a service on the basis of the cell load from the load estimator and requesting the controlled data rate to the system.

17. The apparatus of claim 13, further comprising a handover determiner for controlling one or more handover parameters on the basis of the cell load from the load estimator.

18. The apparatus of claim 17, wherein the handover parameters are at least one of a handover reference value for the RX strength of a serving cell, a handover reference value for the RX strength of a target cell, and a handover reference value for a difference between the RX strength of a serving cell and the RX strength of a target cell.

19. The apparatus of claim 13, further comprising:
a response wait timer operated after transmission of a ranging code; and
a timer manager for updating an expiry time of the response wait timer if the number of ranging response messages for other user terminals received during an operation of the response wait timer reaches a preset value.

20. The apparatus of claim 19, further comprising a controller for:
terminating the operation of the timer and performing a next ranging operation if a ranging response message for the ranging code is received during the operation of the response wait timer; and
retransmitting the ranging code if a ranging response message for the ranging code is not received before the expiry of the response wait timer.

21. The apparatus of claim 19, wherein the ranging code is one of a periodic ranging code, an initial ranging code, a handover ranging code, and a bandwidth request ranging code.

* * * * *